United States Patent [19]

Keough

[11] Patent Number: 4,520,893

[45] Date of Patent: Jun. 4, 1985

[54] ELECTRIC CART STATION

[76] Inventor: Rickey Keough, P.O. Box 1571, 2336 Blake St., San Bernardino, Calif. 92405

[21] Appl. No.: 434,907

[22] Filed: Jan. 7, 1983

[51] Int. Cl.[3] ........................ A61G 5/04; B62D 27/06

[52] U.S. Cl. ..................................... 180/326; 5/81 R; 180/6.5; 180/330; 180/907; 280/242 WC; 280/289 WC; 296/63; 296/65 R; 297/349; 297/DIG. 4; 410/4; 410/7; 410/23; 410/51

[58] Field of Search .................. 180/326, 330, 6.5, 23, 180/DIG. 3, 907, 11; 280/1, 242 WC, 289 WC; 296/65 R, 63; 297/328, 330, DIG. 4, 349, 240, 241; 5/81 R; 410/4, 7, 9, 18, 19, 20, 23, 30, 51

[56] References Cited

U.S. PATENT DOCUMENTS

| | | | |
|---|---|---|---|
| Re. 19,078 | 2/1934 | Barclay | 296/65 R |
| 2,498,004 | 2/1950 | Pullen | 297/240 X |
| 3,865,427 | 2/1975 | Delany | 5/81 X |
| 3,905,436 | 9/1975 | Karchak, Jr. et al. | 180/6.5 |
| 4,019,752 | 4/1977 | Leon et al. | 280/1 |
| 4,274,503 | 6/1981 | MacKintosh | 180/907 X |
| 4,452,327 | 6/1984 | Mowat et al. | 180/11 |

*Primary Examiner*—Joseph F. Peters, Jr.
*Assistant Examiner*—Mitchell J. Hill
*Attorney, Agent, or Firm*—Jerry R. Potts

[57] ABSTRACT

A motor vehicle of the van type having the conventional drivers seat removed, and having a powered wheelchair with a reversible seat at the rear of the wheelchair frame, the wheelchair being positioned at the drivers station and directed rearwardly with the seat directed forwardly, and means for releasably anchoring the wheelchair in that location, the wheelchair seat being located back of the frame thereof to permit the occupant's feet to hang free of the wheelchair frame to make them accessible to the pedals of the motor vehicle.

7 Claims, 6 Drawing Figures

ELECTRIC CART STATION

FIELD OF INVENTION

This invention is in the field of motor vehicles which are capable of receiving wheelchairs at their driver's stations and wherein the wheelchairs or motorized carts are so constructed that they can be driven into a vehicle such as a van, and maneuvered into a position at the driver's station permitting the occupant of the wheelchair or cart to manipulate the controls of the motor vehicle.

PRIOR ART

The following prior art, United States patents, is presently known:

U.S. Pat. No. 3,905,436—Karchak et al—Sept. 16, 1975

U.S. Pat. No. 4,019,752—Leon at al—Apr. 26, 1977

U.S. Pat. No. 4,093,303—Nelson—June 6, 1978

U.S. Pat. No. 4,257,644—Stephens—Mar. 24, 1981

U.S. Pat. No. 4,083,594—Tullock—Apr. 11, 1978

U.S. Pat. No. 4,266,822—Barecki et al—May 12, 1981

All the above patents show means for anchoring or tying down a wheelchair in a motor vehicle. Only in Karchak is there any teaching of anchoring a wheelchair at the drivers station of a motor vehicle to permit the occupant of the wheelchair to drive the motor vehicle. In that patent it is required that the foot rests and arm rests be swingable from normal or conventional positions to positions which free the arms and legs of the wheelchair occupant for movement independently of said foot rests and arm rests. The Karchak patent also provides a vertically movable elevator device to assist in supporting the wheelchair occupant at a convenient vertical position to manipulate the motor vehicle controls and to align the wheelchair to be received by locking channels.

The present invention is one wherein the wheelchair, preferably powered, can be positioned at the drivers station of a motor vehicle such as a van with the wheelchair directed rearwardly, whereupon the occupant can swivel the wheelchair seat to a forwardly facing position relative to the vehicle, leaving his feet free adjacent the rear of the wheelchair to operate the vehicle controls. Karchak's seat support is approximately midway between the front and rear portions of the wheelchair frame, whereas applicants swivel seat support is located more nearly over the rear axle and rear wheels so that when the seat is swiveled through 180 degrees, the feet and legs of the occupant are free of the wheelchair.

DISCLOSURE

The invention relates to a motor vehicle and wheelchair combination wherein a powered wheelchair can be driven up a suitable ramp onto the flat floor of a motor vehicle such as a van and driven to and anchored in a position whereby the occupant of the wheelchair can manipulate the controls of the motor vehicle. It includes a wheelchair which has a swiveled seat located at the rear of the wheelchair frame and is particularly adaptable for a vehicle for handicapped persons having a pair of wheels on a rear axle and a single front wheel on a steerable post, but of course it is capable of use with wheelchairs of somewhat different constructions and those disclosed herein, but which have swiveled seats located to permit driving of motor vehicles and means for anchoring them to the floor of the motor vehicle in the manner described and claimed herein.

It is the general object herein to provide a motor vehicle such as a van with means for anchoring a wheelchair or similar vehicle for the handicapped which can be driven up a ramp and through wide side or back doors of the vehicle to a position at the drivers station, the conventional vehicle drivers seat having been removed. In so do doing, the handicapped person's vehicle preferably has a swiveled single seat at the rear medial portion there, the wheelchair or like vehicle being positioned with its rear end adjacent the controls of the motor vehicle. The occupant then swings on the pivoted seat through an arch which will bring him into a position facing forwardly in the motor vehicle with his feet adjacent the foot pedals thereof. The steering wheel and accessories thereon are also comfortably within reach so that the handicapped person can drive the motor vehicle in a convenient and efficient manner. Means is provided for conveniently and securely anchoring it in the position just described.

The above and other objects and advantages of the invention will more fully appear from the following description in connection with the accompanying drawings.

Figure 1:
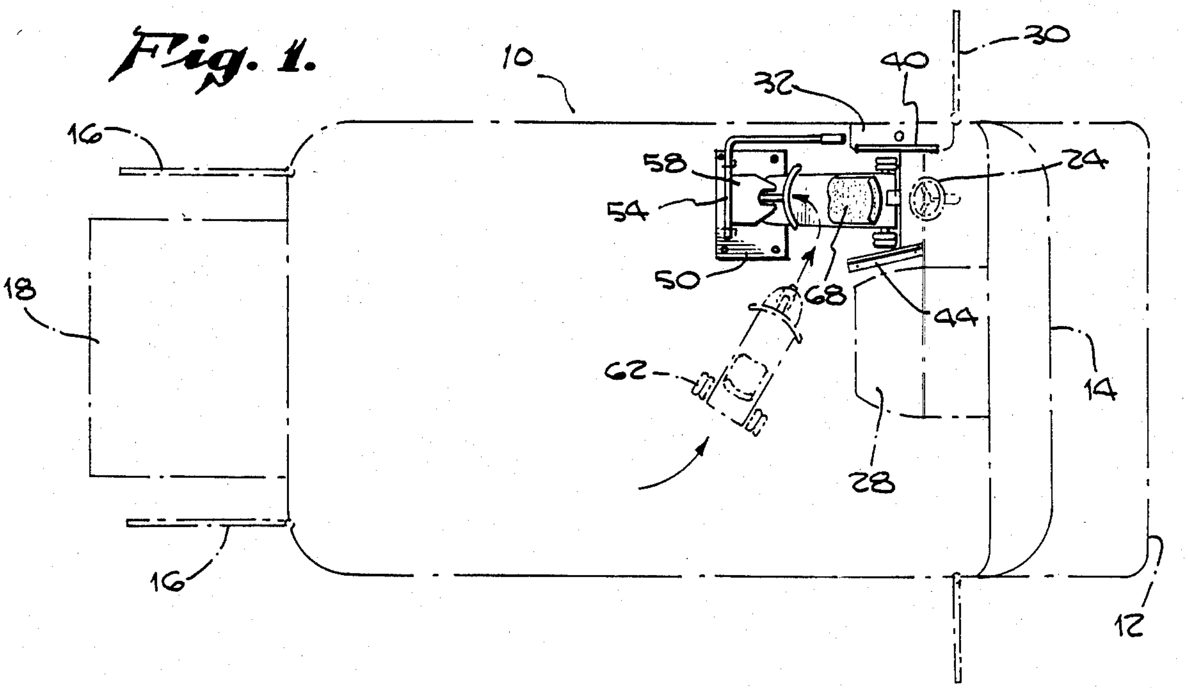
FIG. 1 is a broken line layout of the outlines of a motor vehicle van with open double rear doors and a loading ramp in connection therewith.

In FIG. 1 there is shown a plan outlined in broken lines of a motor vehicle van body 10, it is shown with a forwardly disposed lower body portion 12 and a more rearwardly disposed upper forward body portion 14.

Figure 2:
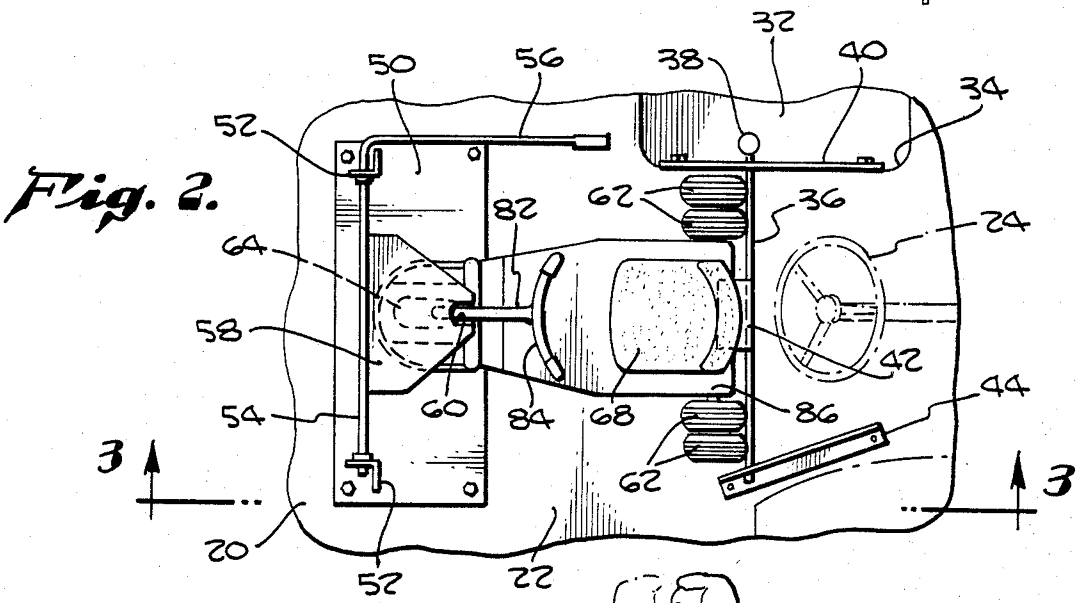
FIG. 2 is an enlarged detail in plan of a powered handicapped person's vehicle in place with its operators seat facing rearwardly relative to the steering wheel of the motor van, the steering wheel being indicated in broken lines.
Figure 3:
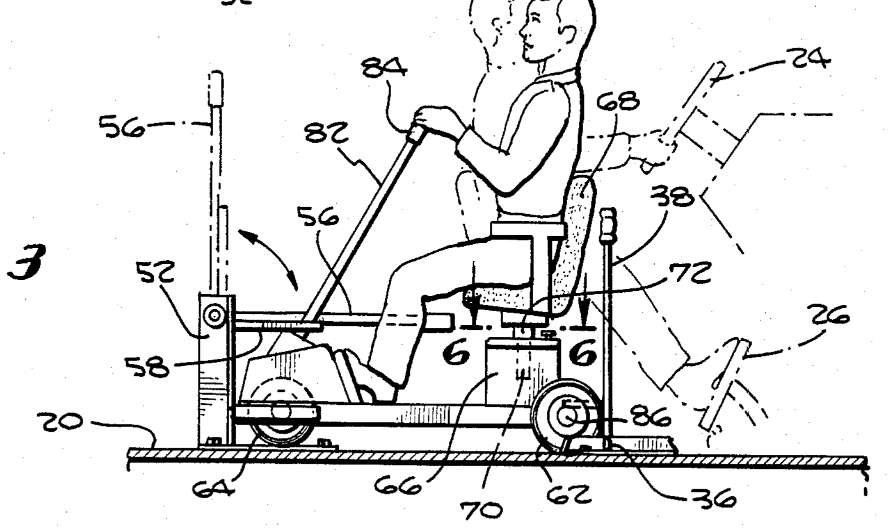
FIG. 3 is a section taken along the line 3—3 of FIG. 2 with part of the anchoring mechanism shown in released and secured positions in broken and full lines respectively, and with the operator and his swiveled seat in opposite positions in full and broken lines.
Figure 5:
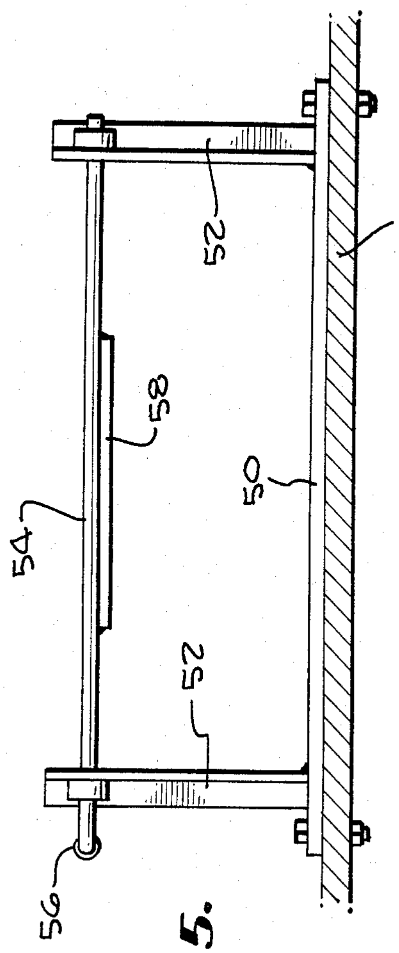
FIG. 5 is an enlarged section taken approximately on the line 5—5 of FIG. 4.

At the rear end is indicated a pair of swinging doors 16 and between the doors is a suitable ramp 18, one end of which may be suitable supported by the floor of the van and the opposite or left end of which would be adapted to rest upon the ground to provide means whereby a wheeled vehicle can be moved up the ramp onto the van floor indicated at 20 in FIGS. 2, 3, and 5. A drivers station 22, is part of the floor which lies rearwardly of the vehicle steering wheel 24, and below the steering wheel, in FIG. 3 there is shown a foot pedal 26. Actually, in a conventional motor vehicle, there would be a set of three pedals if the vehicle has what is known as a "stick shift" transmission, namely a clutch pedal, a break pedal, and an accelerator pedal. In a vehicle having an automatic transmission, the clutch pedal would be eliminated.

Adjacent the drivers station 22 is a conventional engine housing 28. At the opposite side of the drivers station 22 is a drivers access door 30, and in most van constructions there is a recessed step 32 which is lower than the floor 20. A riser 34 extends upwardly from the step 32 to the van floor 20.

Extending across the van floor at the forward portion of the drivers station is a bar 36 which is provided with an operating handle 38 suitably journaled in a vertical plate 40 which preferably is secured to the riser 34 of the step 32. Secured to a medial portion of bar 36 is an angle member 42, which may be welded to bar 36 and which will swing with the bar from the broken line to full line position of the angle when the bar 36 is rotated through 90 degrees by moving the operating handle 38 from its broken line to is full line position.

Figure 4:
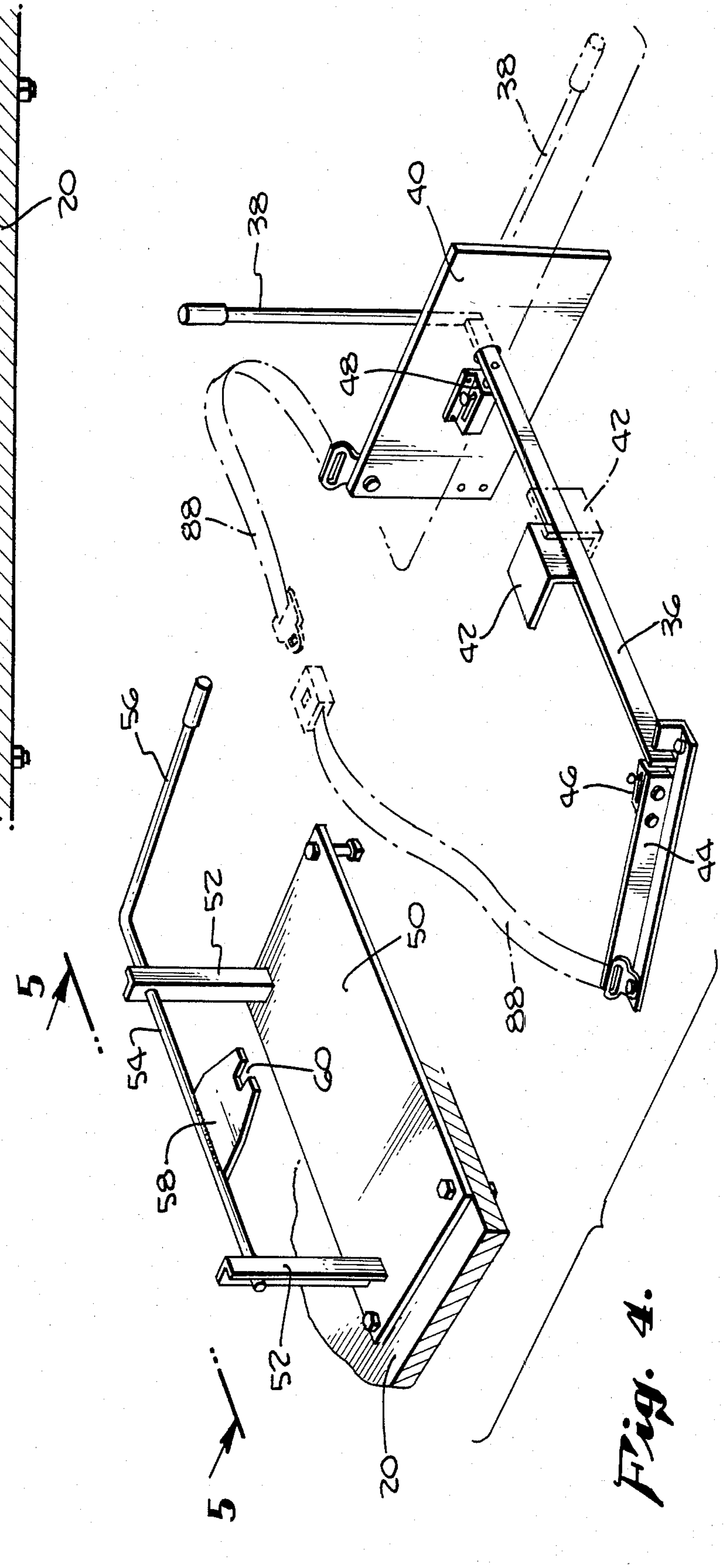
FIG. 4 is an enlarged exploded view of the anchoring mechanism.

The inner end of the bar 36, as viewed in FIG. 4 rests in a strip of angle iron 44, which lies close to the engine housing 28 and acts as a stationary wheel abutment.

To lock the partially rotatable bar 36 in the full line position of the angle member 42 and operating handle 38, suitable sliding bolt units 46 and 48 are provided to be removably shifted into suitable sockets in the bar 36, the sockets being not shown because their locations and functions are evident.

Spaced rearwardly of the transverse bar 36 is a plate 50 which may be bolted to the floor of the motor van. Extending upwardly from plate 50 are laterally spaced vertical angle irons 52 between which are journaled a cross bar 54, one end of which is turned up to provide an operating handle 56. The cross bar 54 has a relatively large plate 58 welded thereto along an edge of the plate so that the plate will rotate with the bar when the handle 56 is swung from the broken to full line positions thereof. The plate 58 has a notch 60 formed in the edge thereof opposite from the edge which is secured to the transverse bar 54.

Shown in FIGS. 1, 2, and 3 is a motorized vehicle for handicapped persons which may be also called a wheelchair. It is not of a conventional wheelchair construction, but is provided with a pair of single or dual rear wheels 62 and a single front wheel 64. Preferably it is driven by a suitable electric power pack 66. A vehicle or electric cart for the handicapped of this general type is manufactured by Amigo Sales Inc., 6693 Dixie Highway, Bridgeport, MI 48722.

The wheelchair or electric cart is provided with a single seat 68 mounted on a seat post 70 in a vertical sleeve 72 carried by the power pack assembly 66. I provide a lever 74 on a pivot 76 extending upwardly from the power pack 66 which lever has a locking pin 78 thereon to be selectively received in one of a pair of notches 80 I have provided in the seat post 70. This permits the seat 68 to be locked in positions 180 degrees apart at the will of the occupant thereof.

The single front wheel 64 of the electric cart or wheelchair is suitably steered by a steering column 82 at the upper end of which is a handle bar 84 such as on a bicycle.

A person who is incapable of walking, can, in many instances, utilize his legs and feet to drive a motor vehicle. It has been found that a user of an electric cart of the type described herein can enter a van-type vehicle through the large rear doors 16 by means of a suitable ramp 18 or from a permanent loading platform at his home and/or place of business, the platform being the same height as the floor 20 of the van body 10. The three wheeled electric cart is driven into the van and backed into the full line position of FIG. 1 on the floor of the van, the usual vehicle driver's seat having previously been removed. The small vehicle is positioned to bring the angle member 42 over the rear axle 86 of the handicapped persons small electric cart and with its rear wheels against the between the stationary abutments comprised of the vehicle plat 40 and the angle iron 44 which acts as a stop to properly orient the cart in alignment with the cross bars 36 and 54. The cart is also positioned centrally of the cross bar 54 upon which the plate 58 is mounted, so that when the handle 56 is swung from its vertical to its horizontal position, the plate 58 will swing downwardly so that the steering post 82 will be received in the notch 60 of said plate 58. Thus, the small electric cart is held against forward movement by the cross bar 36 and its angle member 42 and is held against motion rearwardly relative to the van by means of the plate 58 secured to the cross bar 54.

Figure 6:
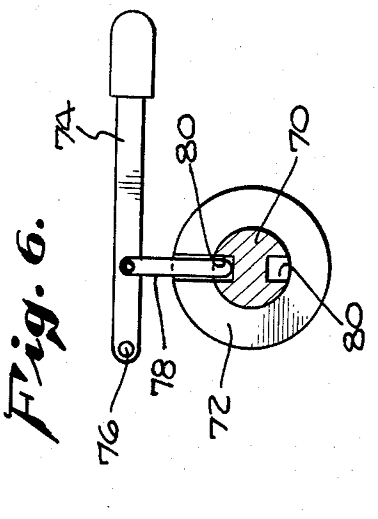
FIG. 6 is an enlarged section taken approximately on the line 6—6 of FIG. 3.

When the driver of the electric cart has reached this position he is facing forwardly as indicated in full lines in FIG. 3. Thereupon, he will actuate the lever 74 of FIG. 6 to release the pin 78 from one of the notches 80 in the seat post. This will permit the occupant of the seat 68 to swing himself and the seat through 180 degrees until both are disposed in a forwardly facing position relative to the motor van. This is indicated by the broken line position of the operator in FIG. 3. The seat is locked in this reversed position by actuation of the lever 74 so that its locking pin 78 will seat in the other of the two sockets 80 of the seat post.

Due to the fact that the front wheel 64, the steering post 82 and handle bar 84 are located at the forward portion of the three wheeled electric cart, it is not possible for the user of the cart to drive into the van and manipulate the controls of the motor van with the electric cart in a forward facing position. The electric cart built by Amigo, mentioned above, is quite suitable for adaptation to the present invention because the seat, modified according to this invention, is swung through 180 degrees, the legs and feet of the occupant are located comfortably close to the foot pedals of the motor van and the steering wheel 24 of the van is convenient to the person's arms.

It is desirable that there be provided a pair of straps 88 comprising a seatbelt assembly whose ends can be suitably secured to the angle iron 44 and to the vertical plate 40 of FIG. 4, as shown therein the vertical plate 40 and the angle iron 44 also comprise stationary abutments between which the rear end portion of the wheel chair is positioned.

While I have described the invention with relation to a van having a large rear door, it could of course be utilized with a van having a relatively wide side door. Furthermore, while the invention has been disclosed in connection with a particular type of invalid chair or wheeled cart, it should be understood that other types of vehicles for the handicapped might be adapted to the invention as well.

It will of course be understood that various changes can be made in the formed details, arrangement, and proportions of the various parts without departing from the spirit of the invention.

I claim:

1. In a motor vehicle having a body with a front end, a rear end and right and left sides, said body having an access door of a size to admit a motorized cart, said vehicle having a floor having a driver's station at the forward side portion thereof, a motorized cart with a seat thereon, a swivel connection between said seat and said motorized cart for rotating said seat from a forwardly facing position to a rearwardly facing position, locking means for securing said seat in said forward facing position, means for releasably restraining said motorized cart at the driver's station from forward, rearward, vertical, and lateral movement, said means including a rotable notched plate connected with the floor of said vehicle to block forward, vertical, and lateral movement of the motorized cart relative to the driver's station and the steering post of said motorized cart, and an angular member also connected with the floor of said vehicle to block rearward, vertical, and lateral movement of the motorized cart relative to the driver's station and the rear portion of said motorized cart, said restraining member being shiftable from a position engageable with the motorized cart to hold it against rearward, forward, vertical and lateral movement, to a position freeing the motorized cart for maneuvering thereof.

2. The structure in claim 1, and motorized cart occupant-available operating means for said restraining member extending upward from said restraining members adjacent said seat when the motorized cart is at said drivers station.

3. The structure in claim 1, and the shiftable restraining member, in its motorized cart engageable position, being adjacent an upstanding portion of the motorized cart to prevent forward, rearward, vertical and lateral movement of the cart on the floor of the vehicle.

4. The structure in claim 1, and the shiftable restraining member having a notched plate between which a portion of the motorized cart is receivable.

5. The structure in claim 2, and the shiftable member having a notched plate between which a portion of the motorized cart is receivable.

6. The structure in claim 2 and said restraining member comprising a bar mounted on said vehicle floor for rotation about its longitudinal axis, an operating handle extending upwardly from said bar at a side of said drivers station, and a fork on said bar for rotation therewith and movable to receive a portion of the motorized cart within it.

7. The structure in claim 1, and said means for releasably restraining the motorized cart including a stationary wheel abutment on the floor of the vehicle, and a restraining member releasably engagable with the motorized cart and holding a portion of the motorized cart against said abutments and the floor of said vehicle.

* * * * *